Figure 1:
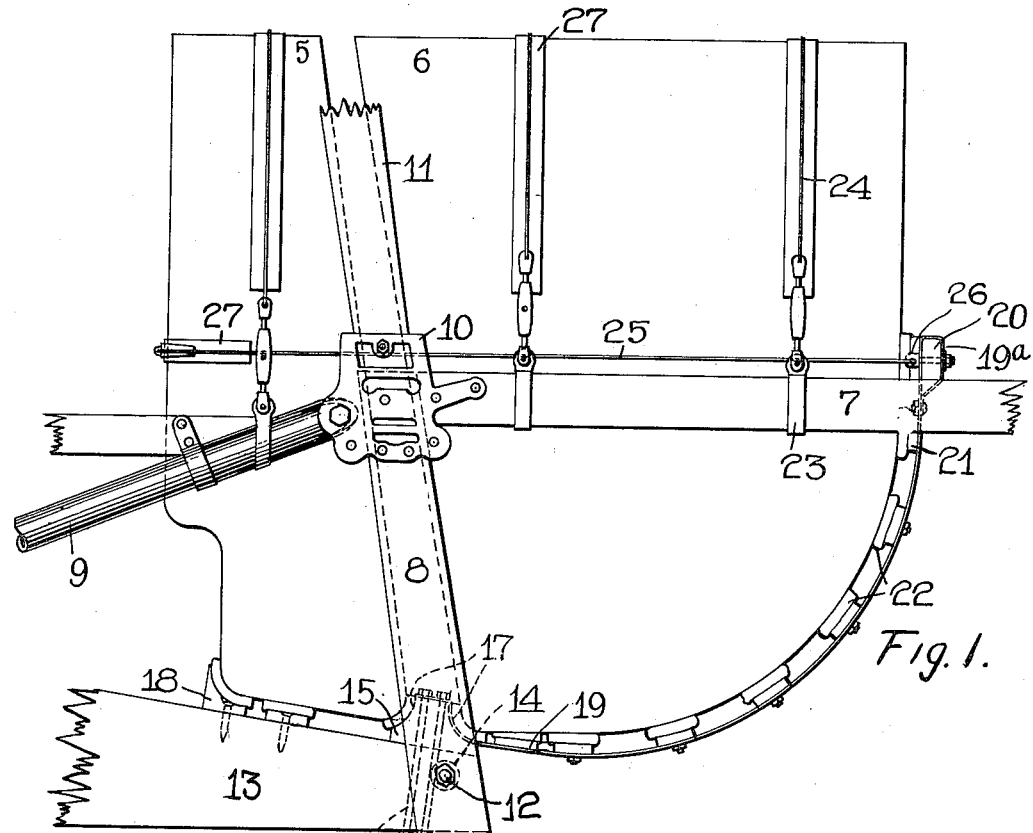

H. KLECKLER.
AEROPLANE FURNITURE.
APPLICATION FILED JAN. 13, 1916.

1,246,024.

Patented Nov. 6, 1917.

INVENTOR
HENRY KLECKLER
BY
ATTORNEY

UNITED STATES PATENT OFFICE.

HENRY KLECKLER, OF BUFFALO, NEW YORK, ASSIGNOR TO THE CURTISS MOTOR CO., A CORPORATION OF NEW YORK.

AEROPLANE FURNITURE.

1,246,024.   Specification of Letters Patent.   Patented Nov. 6, 1917.

Application filed January 13, 1916. Serial No. 71,893.

*To all whom it may concern:*

Be it known that I, HENRY KLECKLER, a citizen of the United States, residing at Buffalo, in the county of Erie and State of New York, have invented certain new and useful Improvements in Aeroplane Furniture, of which the following is a specification.

My present invention has reference to the furniture of aeroplanes and is more particularly concerned with support means for the fuel tank of an aeroplane of the fuselage type.

As a principal object I contemplate the provision of a fuel tank cradle which is adapted to firmly support the tank at the point where its use is most desirable, yet in such a cushioned or yieldable manner that the vibration of the adjacent motor shall be absorbed to as great an extent as possible, without sacrificing the secure support required.

The above and additional objects, to be hereinafter more specifically treated, are accomplished by such means as are illustrated in the drawings, described in the following specification and then more clearly pointed out in the claims, which are appended hereto and form a part of this application.

Figure 2:
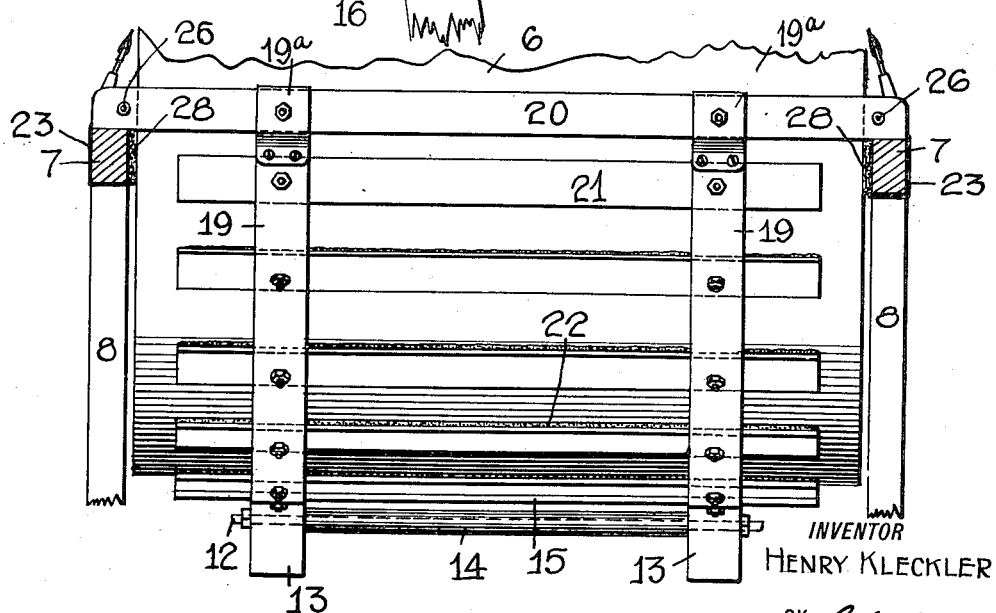

With reference to the drawings, in which there is illustrated one embodiment of the invention, and throughout the several views of which like characters of reference designate similar parts, Figure 1 is a side elevation of a double tank supported in the cradle of this invention, parts of the surrounding fuselage and draft structure of the aeroplane being also shown, and Fig. 2 is a transverse view through the fuselage looking forward at the cradle behind the tank.

It is one of the minor perplexities when constructing aeroplane furniture, to provide a secure berth for the fuel receptacle, to arrange the support adjacent the engine where it is most convenient for use, and at the same time to guard against instability on the part of the contents of the tank due to excessive transmission of vibration from the adjacent engine. If the tank support is made directly rigid with the fuselage, it will be found impossible to properly check the vibrational disturbances, while on the other hand, a firm bed for the tank is so necessary that it is impossible to consider an arrangement which does not provide sufficient security of connection between the tank support and the fuselage.

It has been the accomplishment of the present invention to provide a cradle which not only forms a very secure support for the gasolene tank, in conjunction with the engine bed, which at once determines the convenience of location, but comprehends the employment of cushioning means at all points of contact between the tank and the rigid aeroroplane parts, as well as a somewhat resilient metallic suspension of the tank.

In the construction illustrated, the cradle has been shown as provided for the support of a double gasolene tank, the parts of which are respectively designated by the numerals 5 and 6. In some types of modern aeroplanes where it is a necessity to carry large quantities of motor fuel, and at the same time to conveniently locate the stored fuel with respect to its service points, it has been found that the tank must be reduced in size owing to interference with some of the rigid aeroplane parts, or removed to another location. As an alternative to this practice, I propose the formation of the gas tank in complementary sections which may allow for the interposition therebetween of the obstructing parts of the fuselage proper, without alteration of the general design of the tank and its support or without loss of either its size or convenient location.

In Fig. 1 is shown the forward portion of a modern aeroplane of a well known type, upper longerons 7 of the fuselage terminating at the upper extremities of forward fuselage posts 8, although obliquely continued therebeyond by the draft longerons or bars 9. Fittings 10 are located at the mentioned upper extremities of the posts 8 and serve to connect longerons 7 and 9 thereto, while also forming a socket support for forward wing posts 11 which continue the alinement of the fuselage posts 8. These latter are connected by a tie rod 12 upon which rests rear extremities of engine bed beams 13, such beams being spaced from each other and between opposite posts 8 by suitable tubes 14.

It is the necessity for joining the upper extremities of the fuselage posts which requires that the fuel tank be separated into separate portions, if its dimensions and location are to remain unchanged.

Both of the tank sections 5 and 6 have one edge commonly supported upon the transverse block 15 which is secured to the bed beams 13 through the medium of bolts or other fasteners 16, and is formed with oppositely disposed concave chamfered edges 17 in which are adapted to rest the rounded rear edge of the forward section 5 and the similarly formed forward edge of the rear tank section 6. A block 18 having a similar concaved chamfer is spaced forwardly from the block 15 to receive the forward edge of the tank section 5, while the chamfered edge 17 which supports the forward portion of the tank 6 is lined by a metallic strap 19 which is secured by the engine bed bolts 16 and which extends rearwardly for the support of this main, or rear tank. The straps 19 form the basis of the cradle proper and are bent through an arc of approximately 90° and looped as shown at 19ª, at their upper extremities over a bar 20 which rests transversely upon the longerons 7. Slats 21 connect the straps 19 which are continued rearwardly from each engine bed beam and upon these slats there are provided cushioning strips 22 of felt, fiber or other material capable of fulfilling the same purposes.

Both of the tanks 5 and 6 are secured to longeron 7 through the medium of the longeron clips or straps 23 and the adjustable tensioning means 24 which encircle each tank from longeron to longeron. Moreover the tanks are commonly braced together through the medium of tension means 25 which has its extremities anchored in the I-bolts 26 which pass through the strap loop 19ª and the cradle supporting bar 20, a construction which also obviates the necessity of securing this bar to the longerons 7, as the piercing of the longerons by fastening devices is to be avoided wherever possible. Each of these tension means, both horizontal and vertical, are cushioned from direct contact with the tank by strips 27 of felt or other semi-resilient, and deadening character, to prevent the transmission of the otherwise excessive vibration of the engine and draft portion of the fuselage to the tanks through the taut connecting means 24 and 25. It should be noted that where the tension means 24 for the forward tank has no longeron to act as an anchorage, use may be made of the draft bars 9 for a similar purpose and with no additional labor, after the manner illustrated. It should also be particularly observed that the positioning of felt strips 22 and 27 upon the cradle slats and under the tensioning devices is supplemented by the employment of similar cushioning means along all the support edges for each of the tanks, and also between the sides of the tanks and the adjacent rigid fuselage parts, this latter condition being shown at 28 in Fig. 2.

It should be noted from the foregoing that the fuel tank of an aeroplane may be so arranged when the principles of this invention are followed as to provide it with the choicest location, in spite of interfering framework, and that it may readily be protected from the instability of its contents which would normally be given by engine vibration, through the employment of a substantially flexibly conforming cradle and support means of the character disclosed, particularly in view of the tension means for connecting separate sections of the tank, and for individually tying each section back upon the fuselage.

While in the foregoing, however, there has thus been illustrated in the drawings and described in the specification such combination and arrangement of elements as constitute one preferred embodiment of this invention, it is desired to emphasize the fact that such departures from the particular embodiment disclosed may be made in later adaptations of this invention as shall be recognized as within the scope of the appended claims.

What is claimed is:

1. As aeroplane furniture, the combination with the longerons and engine bed of an aeroplane fuselage, of a flexible cradle support hung from said longerons and fastened to said engine bed, and a fuel tank supported by said cradle in such manner that the principal weight thereof is borne by the engine bed.

2. As aeroplane furniture, the combination with the longerons and engine bed of an aeroplane fuselage, of a cross bar connecting the longerons, and a fuel tank supported by said bed and bar in such manner that the weight of the tank is borne principally by the former and its tendency to longitudinal displacement principally by said bar.

3. As aeroplane furniture, a tank and a substantially flexibly conforming cradle swung from the fuselage of the aeroplane to support the tank.

4. As aeroplane furniture, a fuel tank divided into component sections and means to support the sections upon the fuselage of an aeroplane adjacent to the engine by accommodating portions of the aeroplane framework immediately between the fuel tank sections.

5. As aeroplane furniture, a sectional fuel tank, a flexibly conforming cradle for the support of the fuel tank sections upon the fuselage of an aeroplane and vibration absorbing means lining said cradle.

6. As aeroplane furniture, a sectional fuel tank, means supporting one of said sections upon the engine bed of the aeroplane and means for supporting another of said sections in such proximity to the former as to accommodate therebetween obstructing portions of the aeroplane fuselage.

7. As aeroplane furniture, a sectional fuel tank, means spacing and supporting adjacent edges of the sections to accommodate the tank as a whole in proximity to the engine of the aeroplane and means similarly clamping each of said tank sections in position upon the fuselage of the aeroplane.

8. As aeroplane furniture, the combination with the longerons and engine bed of an aeroplane fuselage, of a cross bar interconnecting the longerons in a plane above the horizontal plane of the engine bed, and a fuel tank jointly supported by said bar and bed, the bed engaging beneath the tank and the bar with an end thereof.

9. As aeroplane furniture, a sectional fuel tank, a block commonly supporting and spacing the tank sections, individual support means for each of said tank sections, similar means for clamping separate sections to the fuselage and means connecting the sections.

10. As aeroplane furniture, a sectional fuel tank, a block commonly supporting and spacing the tank sections, individual support means for each of said tank sections, similar means for clamping separate sections to the fuselage and cushion means carried by all of said supports to prevent transmission of vibration from the aeroplane to either tank section.

11. As aeroplane furniture, a sectional fuel tank, means spacing the sections of the tank from each other, means mutually tying the tank sections and means separately connecting the sections to the aeroplane fuselage.

12. As aeroplane furniture, a sectional fuel tank, means spacing the tank sections, means connecting the tank sections and means providing a cushioned seat for each of said sections separately.

13. As aeroplane furniture, a sectional fuel tank, means supporting one of the tank sections in juxtaposition to the engine of the aeroplane, means complementarily locating a second tank section, means adjustably binding each of said sections to the aeroplane fuselage and means for cushioning both the locating means and the binding means for each tank section.

14. As aeroplane furniture, a sectional fuel tank, means supporting one of the tank sections upon the engine bed of the aeroplane, a cradle supporting a second tank section in spaced relation thereto, means connecting each section to the aeroplane fuselage and means connecting said cradle to the first said section.

15. As aeroplane furniture, a sectional fuel tank, a cradle for supporting one of said tank portions, said cradle including straps, slats connecting the straps and a bar commonly supporting strap extremities upon the fuselage of the aeroplane, and means connecting said bar to another of said tank sections.

16. As aeroplane furniture, a sectional fuel tank, a cradle for supporting one of said tank portions, said cradle including straps, slats connecting the straps and a bar commonly supporting strap extremities upon the fuselage of the aeroplane, and cushion means interposed between said tank section and said cradle, and between the section of said fuselage.

17. As aeroplane furniture, the combination with the longerons and engine bed of an aeroplane fuselage, of a fuel tank mounted to rest upon and overhang one end of the engine bed, and to extend upwardly beyond the horizontal plane of the longerons, and means engaging the overhung portion of said tank to afford with said bed a tank support.

In testimony whereof I affix my signature.

HENRY KLECKLER.

Witness:
C. M. WEHRFRITZ.

Copies of this patent may be obtained for five cents each, by addressing the "Commissioner of Patents, Washington, D. C."